J. J. HOBBS.
INSECT AND ANIMAL EXTERMINATOR.
APPLICATION FILED DEC. 21, 1911.
1,042,437.
Patented Oct. 29, 1912.
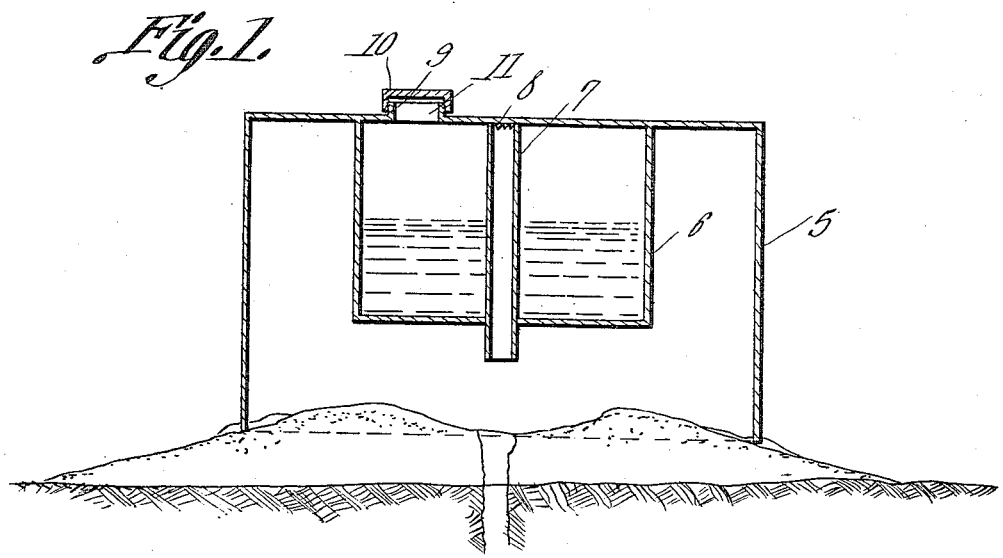
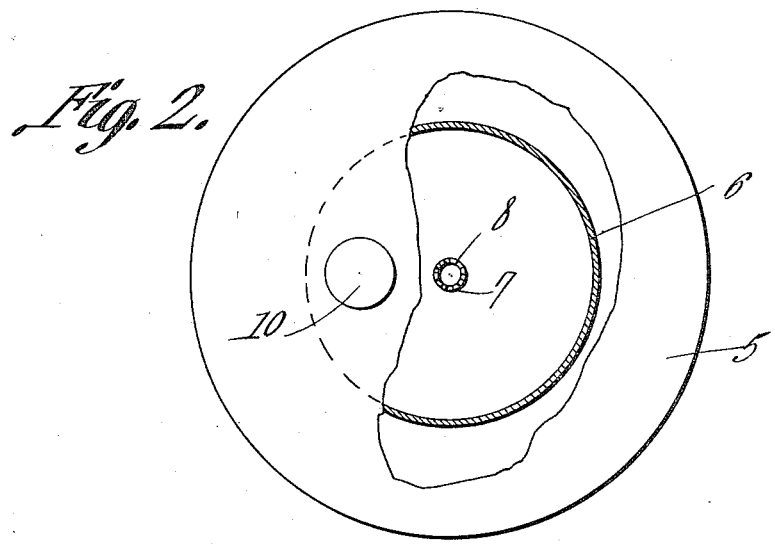
Witnesses
James J. Hobbs  Inventor
by  Attorneys

UNITED STATES PATENT OFFICE.

JAMES JOSEPH HOBBS, OF MATHIS, TEXAS, ASSIGNOR OF ONE-HALF TO JOSEPH T. MAHONEY, OF MATHIS, TEXAS.

INSECT AND ANIMAL EXTERMINATOR.

1,042,437.　　　　　Specification of Letters Patent.　　Patented Oct. 29, 1912.

Application filed December 21, 1911.　Serial No. 667,127.

*To all whom it may concern:*

Be it known that I, JAMES J. HOBBS, a citizen of the United States, residing at Mathis, in the county of San Patricio and State of Texas, have invented a new and useful Insect and Animal Exterminator, of which the following is a specification.

This invention relates to exterminators for destroying ants and burrowing insects, animals and vermin of various descriptions.

This invention has for its object to provide a device which may be set over the holes and burrows of insects, animals and vermin and which is adapted to contain a highly volatile liquid to give off a noxious or deleterious gas or fume to descend into the holes and burrows to destroy the insects, animals or vermin, as well as destroying those which may be on the surface of the soil in proximity to the holes or burrows.

This invention also has for its object to provide a device of this character which shall be simple and inexpensive in construction, efficient and convenient in use, and which shall be practically non-spillable.

To the above ends this invention resides broadly in a hood adapted to be set over the hole or burrow in connection with a receptacle for containing a volatile liquid to give off a noxious gas into the hood.

The invention embodies the novel construction and combination of parts hereinafter described and claimed, reference being had to the accompanying drawings, wherein similar reference characters indicate similar parts, and wherein:—

Figure 1 is a central vertical section of the exterminator as applied to an ant hill. Fig. 2 is a plan view of the exterminator, part of the top thereof being broken away to expose the interior.

Referring specifically to the drawings, 5 designates a cylindrical hood, constructed of sheet metal or other suitable material, and 6 designates a cylindrical receptacle or cup of smaller diameter and shorter than the hood secured to and depending from the top of the hood 5, the receptacle or cup 6 also being arranged concentric with the hood 5 and forming an annular chamber between the sides of the hood and receptacle. The receptacle or cup 6 being secured to the top of the hood 5 is closed, but the top of the hood 5 is provided with a small opening 11 therein leading into the chamber within the receptacle 6. A nipple 9 projects upwardly from the hole 11 and a closure 10 is adapted to be screw-threaded onto the nipple 9 to close the opening 11.

A tube 7 passes centrally or axially through the bottom of the receptacle or cup 6 and extends above the bottom thereof to the top of the hood 5, the lower end of the said tube depending from the bottom of the receptacle 6 and terminating short of the lower end of the hood. The upper end of the tube 7 which is in contact with the top of the hood 5 is serrated or notched as designated at 8 to provide vents establishing a communication from the chamber within the receptacle 6 into the tube 7.

The receptacle or cup 6, tube 7, and the cap 10 are preferably constructed of sheet metal, but the same may be constructed of any other suitable material.

In use, the hood 5 is set over the hole or burrow containing the insects, animals or vermin to be destroyed, and the cap 10 is removed and carbon bi-sulfid is poured into the receptacle or cup 6 through the opening 11 and the cap 10 then secured in place to close the opening 11. Carbon bi-sulfid is a highly volatile liquid which boils at 48° and gives off a deleterious or noxious gas, which with the ordinary commercial carbon bi-sulfid is malodorous. The gas or fume given off is deadly to insects, animals or vermin, and the gas or fume will pass into the tube 7 and down the said tube into the space or chamber within the hood. This gas is heavier than air and will descend into the hole or burrow of the insects, animals or vermin, and will poison them. The gases will descend entirely throughout the hole or burrow, including the nest or nests, and branches, and will therefore destroy all the insects, animals or vermin under the surface of the soil in passages communicating with the hole or burrow leading to the surface of the soil as well as killing the insects, animals or vermin on the surface of the soil in proximity to the hole or burrow. As shown in Fig. 1, the exterminator is applied to an ant hill, and it will be noted that the lower edge of the hood in being sunk slightly into the ant hill or soil incloses the chamber or space within the hood and prevents the escape of the gases or fumes or of the insects, animals or vermin.

It will be noted, that the structure in the present device is such, that the lower end of the hood 5 may be forced into the soil around a burrow or hole, so that the lower or depending end of the tube 7 may enter the burrow or hole, the receptacle 6 seating on the soil adjacent the burrow or hole. In this manner the fumes may be caused to flow directly into the burrow or hole from the receptacle 6, to assure the proper operation of the device. It will be noted that when the hood is forced into the soil, the air and gas within the hood will be compressed, particularly the air and gas within the annular chamber between the sides of the receptacle and hood, so that the gas within the receptacle will be compressed and will be forced down the burrow or hole. The gas will also accumulate in the chamber between the sides of the receptacle and hood so as to provide a trap for containing some of the fumes in order to exterminate insects within the hood, which may escape from the burrow or hole from under the receptacle 6. It will be further noted, that by removing the closure 10, the hood may be readily withdrawn from the soil, air being admitted into the hood through the opening 11 and through the tube 7. The lower end of the tube 7 terminates short of the lower end of the hood in order to assure the engagement of the hood with the soil prior to the entrance of the tube into the burrow or hole. Carbon bi-sulfid is preferable for this purpose for the reason of its low boiling point, thereby assuring the evaporation thereof at ordinary temperatures, and for the reason that the gases or fumes given off thereby are deadly to all insects, animals and vermin.

This device is practically non-spillable for the reason that the receptacle or cup 6 in practice would only be partially filled with carbon bi-sulfid and upon the hood being turned over on its side the level of the liquid would not rise into the tube 7, or upon the hood being inverted the liquid would not flow therefrom and upon the hood being erected any liquid within the tube would flow back into the receptacle or cup 6. After the carbon bi-sulfid has been poured into the receptacle or cup 6 and the cover 10 secured over the opening 11, this device needs no further attention, and does not require the assistance of external forces, such as a pump, bellows or the like to force the gases or fumes down the hole or burrow of the insects, animals or vermin.

An exterminator of this character is simple in construction and inexpensive to manufacture, and in its use is both convenient and efficient.

Having described the invention, what is claimed as new is:

1. An insect and animal exterminator, comprising a cylindrical hood, a cylindrical receptacle of smaller diameter and shorter than the hood secured to and depending concentrically from the top of the hood, adapted to contain a volatile fluid to give off noxious gas, and forming an annular chamber between the sides of the hood and receptacle, the hood having an opening in the top thereof communicating with the chamber within the receptacle, a closure for the opening, and a tube passing axially through the bottom of the receptacle with the lower end depending below the bottom of the receptacle and terminating short of the lower end of the hood, the said tube serving to convey the gas from the receptacle.

2. An insect and animal exterminator, comprising a hood, a receptacle of smaller dimensions than the hood secured to and depending concentrically from the top of the hood, adapted to contain carbon bi-sulfid so as to give off a noxious gas, and forming a chamber between the sides of the hood and receptacle, and a tube passing through the bottom of the receptacle to convey the gas from the receptacle.

In testimony that I claim the foregoing as my own, I have hereto affixed my signature in the presence of two witnesses.

JAMES JOSEPH HOBBS.

Witnesses:
T. J. HARRISON,
W. O. CAIN.

Copies of this patent may be obtained for five cents each, by addressing the "Commissioner of Patents, Washington, D. C."